United States Patent [19]

Bell

[11] 4,320,431
[45] Mar. 16, 1982

[54] FLUID CIRCULATING PUMP

[75] Inventor: Clifford J. Bell, Mt. Pleasant, Ind.

[73] Assignee: Westinghouse Electric Corp., Pittsburgh, Pa.

[21] Appl. No.: 124,687

[22] Filed: Feb. 26, 1980

[51] Int. Cl.³ .............................................. H02H 7/08
[52] U.S. Cl. ......................................... 361/23; 361/1; 308/1 A; 340/682; 310/68 B; 200/61.4; 116/208
[58] Field of Search ......................... 361/23, 22, 20, 1; 308/1 A; 200/61.4, 61.42; 340/682, 683, 686; 310/68 B; 184/1 C, 1 B; 116/DIG. 21, 208; 417/63, 44, 13; 188/1 A

[56] References Cited

U.S. PATENT DOCUMENTS

| | | |
|---|---|---|
| 449,411 | 3/1891 | Hannah . |
| 1,284,701 | 11/1918 | Junggren ............................ 308/1 A |
| 3,108,264 | 10/1963 | Heindo .............................. 200/61.4 |
| 3,176,286 | 3/1965 | Dschen ............................. 340/682 |
| 3,508,241 | 4/1970 | Potter ............................... 340/682 |
| 3,897,116 | 7/1975 | Carpenter ......................... 308/1 A |
| 4,057,365 | 11/1977 | Colmer ............................. 308/1 A |

FOREIGN PATENT DOCUMENTS 336660 12/1919 Fed. Rep. of Germany ..... 200/61.4

*Primary Examiner*—Patrick R. Salce
*Attorney, Agent, or Firm*—D. R. Lackey

[57] ABSTRACT

Fluid-cooled electrical apparatus having a new and improved pump for circulating the fluid within the apparatus. The pump has a motor portion in fluid communication with a pump portion, non-electrically conductive bearings supporting a common shaft between the two portions, and means for detecting shaft displacement due to bearing wear. Electrically conductive contact rings disposed within recesses in the bearings' sleeve and thrust surfaces complete an electric connection with the shaft in the event of bearing wear. Circuit means connected to the electrically conductive contact rings deenergizes the motor when the contact rings detect predetermined bearing wear.

7 Claims, 4 Drawing Figures

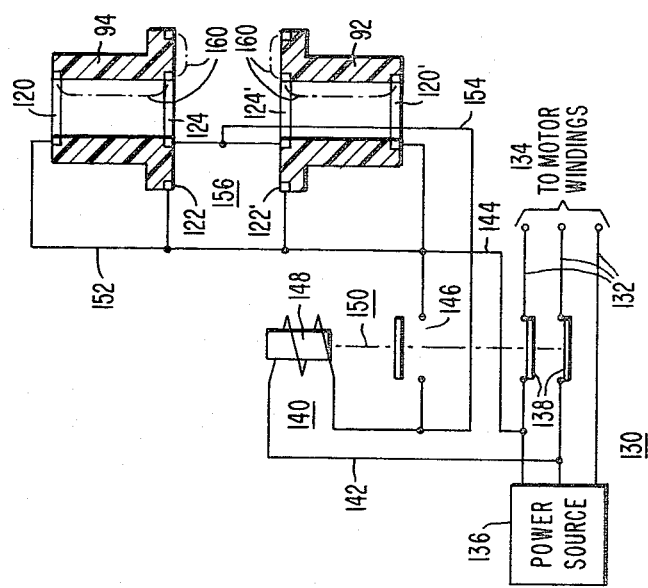
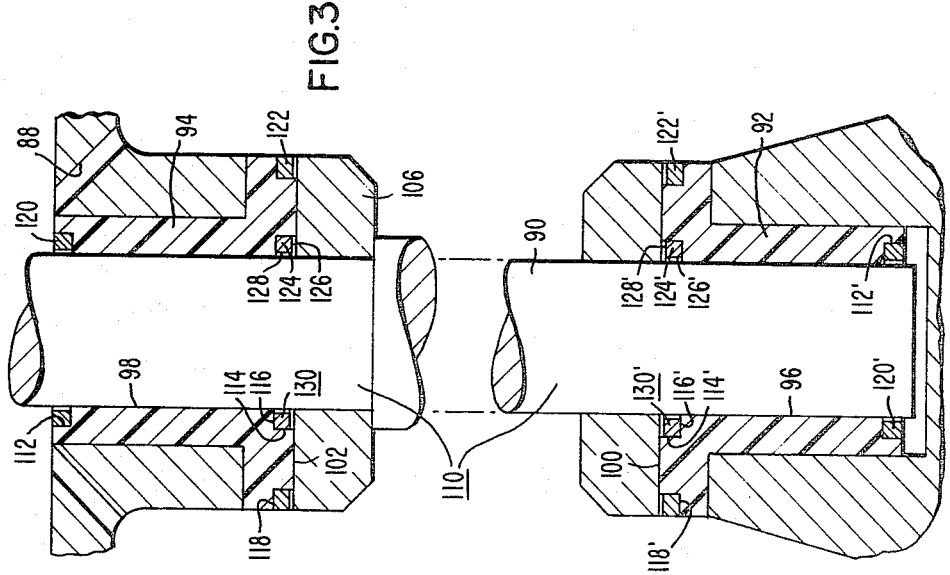

FLUID CIRCULATING PUMP

BACKGROUND OF THE INVENTION

1. Field of the Invention

The invention relates in general to fluid-cooled electrical apparatus such as power transformers and in particular to an improved fluid circulating pump used in such apparatus.

2. Description of the Prior Art

Electrical power transformers are commonly cooled with an insulating and cooling dielectric fluid such as mineral oil. Those with higher KVA ratings require forced cooling in order to keep their size reasonable for production, shipping and installation. Forced cooling is accomplished by a pump or pumps pulling the oil from external radiator-type heat exchangers and forcing it through the transformer.

Generally, these oil circulation pumps have the motor portion in fluid communication with the pump portion of the oil pump. Alternate possible designs could have the motor sealed from the pump by a stuffing box surrounding a common shaft. Pumps with the motor portion sealed off from the pump portion have inherent cooling, lubrication and maintenance disadvantages. The motor must be cooled by some means. Air-cooled motors are much larger than their oil-cooled counterpart and require periodic lubrication. Oil-cooled motors that are sealed from the impeller side of the pumping unit require an expensive sealed oil-to-oil or oil-to-air heat exchanger for cooling. Also required are provisions to accommodate oil expansion with increasing temperature within the sealed system. Thus, pumps having oil-cooled motors that are sealed from the impeller side of the pumping unit are not practical from an economic viewpoint. Both types of alternate units require periodic maintenance of the means for sealing the common shaft.

Since a transformer is relatively maintenance-free and is generally unattended, the advantages of a pump unit with the motor portion in fluid communication with the impeller or pump portion can be appreciated. This design allows elimination of the shaft sealing means and its inherent maintenance. In addition, a small portion of the transformer oil being pumped through the apparatus is circulated through the motor for cooling and lubrication purposes, thus reducing the size and cost of the unit over the alternatives discussed above. However, wear of the metallic parts of pumps of this design causes contamination of the dielectric cooling fluid with sub-micron-sized electrically conductive particles which are then distributed throughout the transformer by the pump. This electrically conductive particle contamination tends to reduce the dielectric properties of the insulating and cooling fluid as well as any solid dielectric material within the transformer on which the particles might collect. In addition, contamination of gross amounts of nonelectrically conductive particles can also be damaging to the dielectric properties of the insulating fluid.

Non-metallic or non-electrically conductive bearings alone will not solve this contamination problem. Should a bearing fail, metallic particles would still be rubbed off the rotor and stator as these components cannot be replaced with non-electrically conductive substitutes. Also, an uncontrolled quantity of non-electrically conductive particles could be present from wear of non-electrically conductive bearings. This contamination problem of conductive and/or non-conductive particles is even present in the isolated motor/impeller design since, should a bearing completely fail, the shaft seal would likely be damaged, allowing contaminants on the motor side to migrate to the impeller side and be circulated throughout the system. The only previous known arrangement that would not be plagued with this contamination problem would be a separate motor and separate pump combination. This arrangement, however, must have a means such as a universal joint or constant velocity joint to couple their shafts together. Special alignment procedures are required for this arrangement, as well as maintenance of the coupling means. Therefore, the separate motor and pump combination unit is not among those under active consideration at the present time.

Accordingly, it would be desirable to be able to detect the beginning of bearing failure within an oil pump. It would also be desirable to provide for de-energizing the motor in the event bearing wear is detected to prevent contamination by electrically conductive particles, and prevent uncontrolled contamination by non-electrically conductive particles.

SUMMARY OF THE INVENTION

Briefly, the present invention is a new and improved fluid-cooled electrical apparatus, such as a liquid-filled transformer having a new and improved pump for circulating the cooling/insulating fluid within the apparatus. The pump has a motor portion in fluid communication with a pump portion, non-electrically conductive non-metallic bearings supporting a common shaft between the two portions and means for detecting shaft displacement due to bearing wear. Electrically conductive contact rings disposed within recesses in sleeve and thrust surfaces of the bearings complete an electrical connection through the shaft and thrust collars disposed on the shaft, thereby detecting shaft displacement in any direction due to wear of the bearings' sleeve and/or thrust surfaces. Circuit means connecting the electrically conductive contact rings with a motor de-energizing circuit provides for de-energization of the stator of the motor when the contact rings detect a predetermined bearing wear.

BRIEF DESCRIPTION OF THE DRAWINGS

The invention may be understood and further advantages and uses thereof more rapidly appreciated when considered in view of the following detailed description of exemplary embodiments, taken with the accompanying drawings in which:

FIG. 3 is a cross-sectional view of an enlargement of a non-electrically conductive bearing employed in the pump of FIG. 2;

FIG. 4 is a schematic diagram of a circuit used to de-energize the pump when bearing wear is detected according to the teachings of the invention.

DESCRIPTION OF PREFERRED EMBODIMENTS

Figure 1:
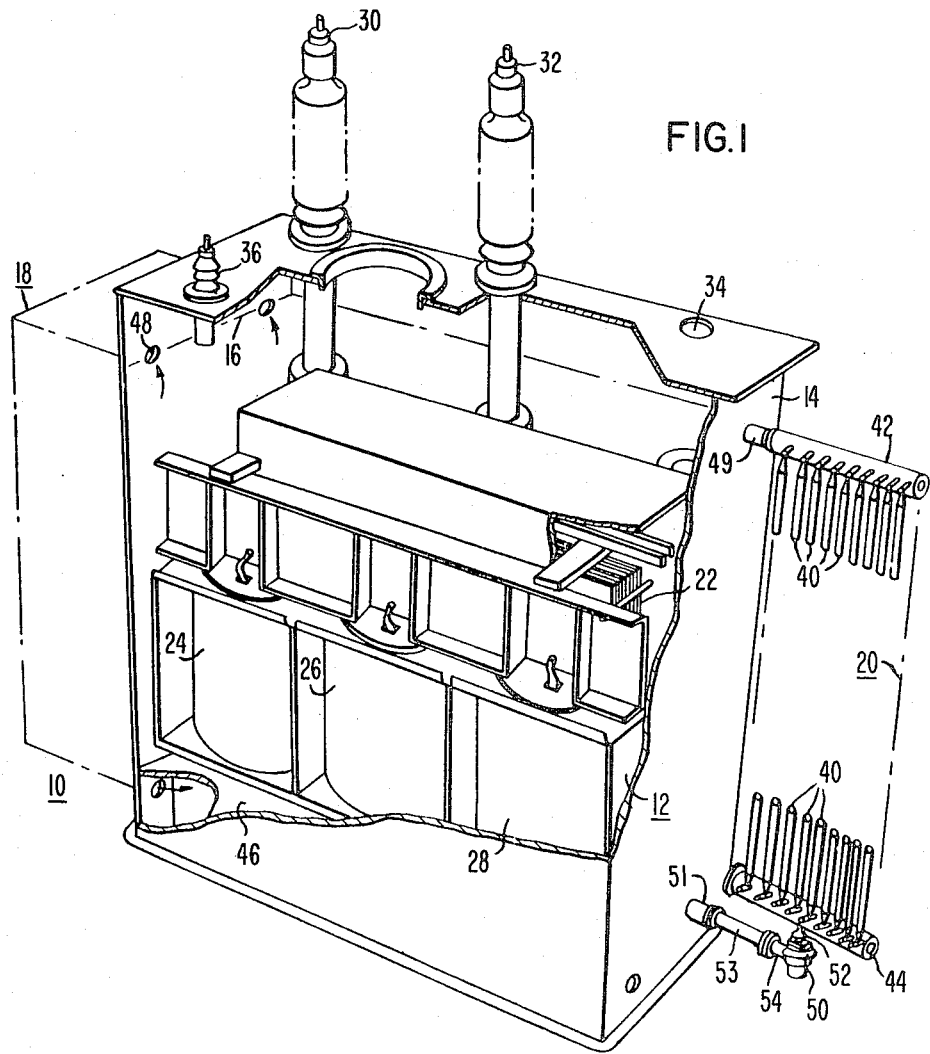
FIG. 1 is a pictorial view of a transformer partially cut away and partially in phantom which may be constructed according to the teachings of the invention.

Throughout this description like elements will be identified with like numerals. Similar elements will be identified by the numeral assigned to the earlier described element with the addition of a prime affixed thereto. Referring now to the drawings and FIG. 1 in particular, there is shown a pictorial view, partially cut away, and partially in phantom, of an electrical power transformer 10 which may be constructed according to the teachings of the invention. Transformer 10 includes a magnetic core-winding assembly 12 disposed within a tank 14. The tank 14 is filled to a level 16 with a liquid insulating and cooling medium or dielectric, such as mineral oil. The magnetic core-winding assembly 12 is immersed in the liquid dielectric, which aids in insulating the various electrical conductors from one another, and from ground, and the liquid dielectric also serves to cool the transformer 10.

Heat exchangers or coolers, shown generally at 18 and 20 are connected to the tank 14 via fluid conductor means, with the liquid dielectric circulating therethrough by forced circulation, to remove the heat from the liquid dielectric which it has picked up from the magnetic corewinding assembly 12.

Transformer 10, in this example, is a three-phase transformer of the core form type, but it is to be understood that the invention is applicable to any type of fluid-cooled electrical apparatus, such as transformers, reactors, contactors and other devices in which fluid movement without contamination due either to metallic particles, or non-metallic particles is required.

More specifically, transformer 10 includes a magnetic core 22 and phase-winding assemblies 24, 26 and 28 disposed about winding legs of the magnetic core 22. Each phase winding assembly includes low- and high-voltage windings concentrically disposed about a winding leg of the magnetic core, with the high-voltage windings being connected to high-voltage bushings, of which two bushings 30 and 32 are shown in FIG. 1, with the third high-voltage bushing being mounted in opening 34. The low-voltage windings, if connected in wye, have their neutral ends connected to neutral bushing 36, and their other ends are connected to low-voltage bushings disposed on the portion of the tank cover cut away in FIG. 1.

Transformer 10 is cooled by circulating the liquid dielectric upwardly through the tank 14, entering the tank below the barrier 46, which directs the liquid dielectric upwardly through ducts in the windings in a predetermined pattern. The liquid dielectric leaves the tank through openings disposed in the upper portion of the tank, such as through opening 48, and flows downwardly through heat exchangers 18 and 20, where heat is removed from the liquid dielectric, and then back into the tank below the barrier layer 46. Each of the heat exchangers, such as heat exchangers 20, includes a plurality of hollow, flat, fin-type elements 40, which are in fluid communication with upper and lower headers 42 and 44, respectively. Only a sufficient number of elements 40 and headers 42 and 44 are illustrated in FIG. 1 to properly illustrate the construction, as there are usually a large plurality of rows of such elements in each core or heat exchanger. Further, the heat exchangers may be disposed on one or more sides of the transformer, depending upon the specific rating and cooling requirements of the apparatus.

The upper header 42 is connected directly to tank 14 through fluid conductor means 49, while the lower or collecting header 44 is connected to tank 14 through fluid conductor means 51 and 53, and a liquid pump 50. The pump 50 includes an inlet 52 which is connected to header 44 via suitable fluid conductor means, and an outlet 54 which is connected to tank 14 via fluid conductor means 53 and 51.

Because transformers, such as transformer 10, are relatively maintenance-free apparatus, and are generally unattended, the design of pumps such as pump 50 has been made to ensure this same condition of little or no maintenance. To accomplish this end, pumps such as pump 50 are made with an integral, hermetically sealed motor in fluid communication with the pump itself, thus eliminating shaft sealing means and its inherent maintenance. A small portion of the pumped transformer oil is bled off and circulated through the motor, to coat and lubricate the motor, and make it maintenance free. This also allows a smaller physical size than would be required by alternative designs. One detrimental effect of a pump of this design that must be guarded against is the contamination of the dielectric fluid being circulated by the pump with metallic or conductive particles from bearings, rotor and stator, etc. generated in the motor area and transported out into the main transformer oil flow by that oil used in cooling the motor. Pump 50 was developed to eliminate this problem of contamination of the dielectric cooling medium with electrically conductive particles, and minimizing contamination with non-electrically conductive particles, and their subsequent circulation throughout the apparatus. Basically, this is accomplished by replacing components subject to frictional wear with non-metallic and non-electrically conductive substitutes wherever possible, and by preventing contact of metallic or electrically conductive components where non-electrically conductive substitutes cannot be made. This second aspect of the solution was carried out by inventing means for detecting the beginning of bearing failure and shutting down the unit whenever a predetermined amount of bearing wear is detected, thus preventing the circulation of oil or other cooling insulating fluid which has been contaminated with metallic or electrically conductive particles, and/or an uncontrolled amount of non-electrically conductive contaminating particles.

Figure 2:
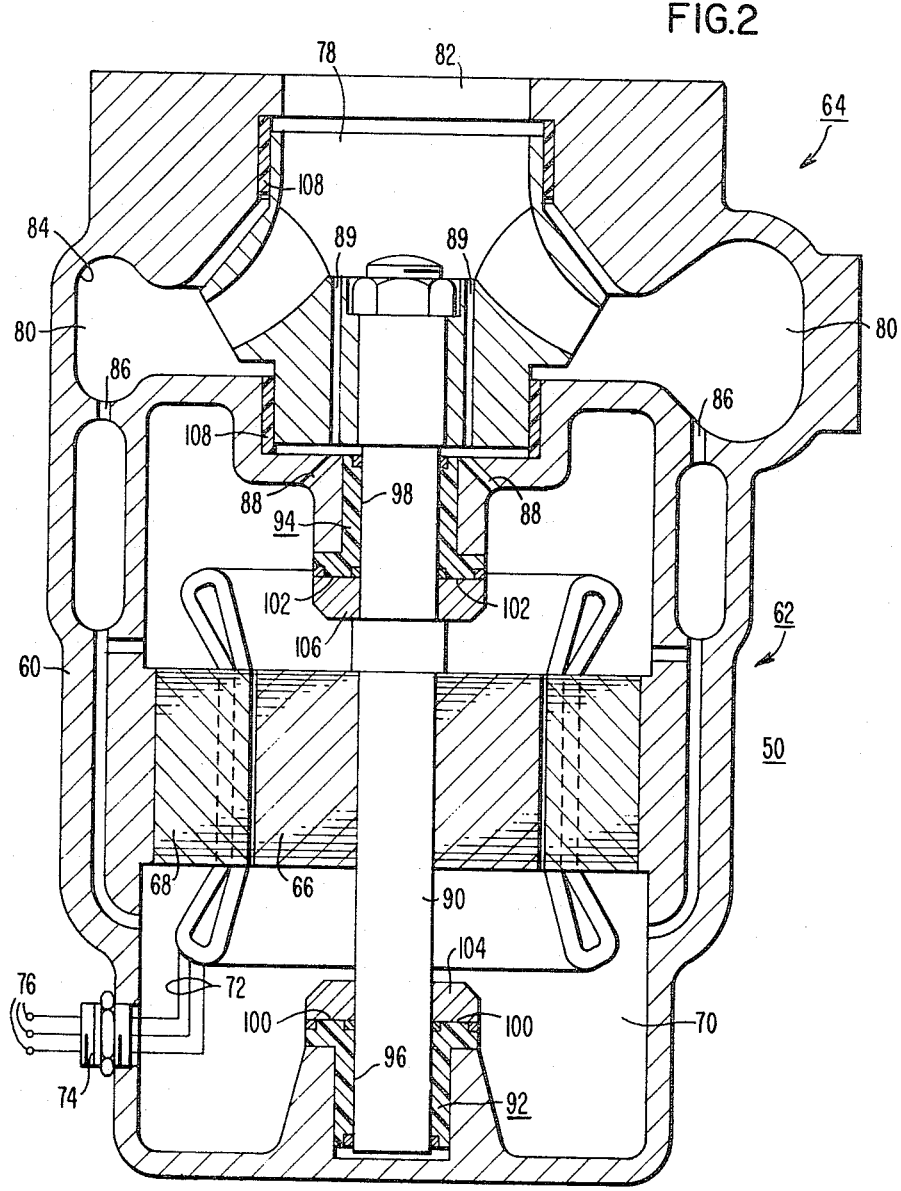
FIG. 2 is a cross-sectional view of a pump constructed according to the teachings of the invention, which may be used with the transformer shown in FIG. 1.

Referring again to the drawings, and to FIG. 2 in particular, there is shown a cross-sectional view of pump 50. Pump 50 is constructed according to the teachings of the invention, with FIG. 2 showing the non-electrically conductive substitutes and the means for detecting the beginning of bearing wear. More specifically, pump 50 includes housing 60 having motor portion 62 and pump portion 64. Motor portion 62 includes rotor 66 and stator 68 disposed in motor chamber 70. Rotor 66 and stator 68 are formed in the conventional manner. Stator 68 is energized by electrical wires 72 in the conventional manner, with three wires being shown as required for a three-phase motor. Electrical wires 72 pass through fluid-tight conduit 74 and terminate at terminals 76, which terminals are suitable for connection to an external power supply. Pump portion 64 includes an impeller 78 having impeller ports 89 disposed in impeller chamber 80. Motor portion 62 and pump portion 64 of pump 50 are in fluid communication with each other by means of fluid orifices 86 and end bell ports 88 connecting motor chamber 70 with impeller chamber 80.

Rotor 66 and impeller 78 are mounted on a rotatable metallic shaft 90 which extends between the motor portion 62 and the pump portion 64 of housing 60. Shaft 90 is mounted for rotation in housing 60 by means of first and second non-electrically conductive bearings 92 and 94, respectively. Bearings 92 and 94 include sleeve surfaces 96 and 98, respectively, disposed radially adjacent to and in contact with shaft 90, and thrust surfaces 100 and 102, respectively. The thrust surfaces 100 and 102 are shown disposed perpendicular to sleeve surfaces 96 and 98, respectively, for purposes of example. However, it is to be understood that the thrust surfaces may be at any angle which will accept thrust loads. Non-electrically conductive bearings 92 and 94 may be made of suitable resins, laminates and ceramic materials, either fired or unfired. Glass silicon tubing, type G7, grades number HY-1806, a silicon laminate sold under the trademark MICARTA by Westinghouse Electric Corporation, has been used successfully in the test of a prototype of the preferred embodiment of the invention. Other non-conductive ceramics, resins and laminates with characteristics of good oil resistance and temperature stability would also be suitable. First and second metallic thrust collars 104 and 106, respectively, are rigidly disposed on shaft 90 axially adjacent to and in contact with thrust surfaces 100 and 102, respectively. Thrust surfaces 100 and 102 both face inward and thrust collars 104 and 106 both face outward so as to prevent shaft 90 from movement in either axial direction. Of course, both the thrust surfaces and thrust collars could face vice versa, the important thing being that the thrust surfaces face opposite directions so that shaft 90 is axially captured. In order to remove torsional strain from the second non-electrically conductive bearing 94, and to provide for additional support for impeller 78, non-electrically conductive wearing rings 108 may be inserted between impeller 78 and housing 60. Wearing rings 108 may be made from the same materials used for the non-metallic or non-electrically conductive bearings 92 and 94.

During operation of pump 50, rotation of impeller 78 moves the fluid to be pumped from the suction side 82 (corresponding to inlet 52 in FIG. 1) of impeller chamber 80 to the pressure side 84 of impeller chamber 80. (The outlet of pump 50, corresponding to outlet 54 of FIG. 1, would be located along a portion of the pressure side 84 of chamber 80 which is not shown in the cross-sectional view of FIG. 2.) Since the fluid orifices 86 pass through housing 60 to enter the pressure side 84 of impeller chamber 80, there will be a small bleed off of oil into the motor chamber 70. This oil circulates in the motor chamber 70, cooling motor portion 62 of pump 50, and lubricating first and second non-metallic or non-conductive bearings 92 and 94, respectfully. The oil subsequently returns to the suction side 82 of the impeller chamber 80, passing through end bell ports 88 of the housing 60 and impeller conduits 89.

Referring now to FIG. 3, there is shown in cross section an enlarged view of the second non-electrically conductive bearing 94. FIG. 3 shows in detail detecting means 110 for detecting shaft displacement in any direction due to bearing wear. Detecting means 110 includes two recesses in each of the respective sleeve and thrust surfaces of the first and second non-electrically conductive bearings 92 and 94, such as sleeve recesses 112 and 114 disposed in sleeve surface 98, and thrust recesses 116 and 118 disposed in thrust surface 102, respectively, of the second non-electrically conductive bearing 94.

Sleeve recess 114 and thrust recess 116 are located at the adjacent ends of sleeve surfaces 98 and thrust surface 102 so as to coincide with each other to form a coincident recess 130 having a sleeve portion corresponding to sleeve recess 114 and a thrust portion corresponding to thrust recess 116. Detecting means 110 further includes electrically conductive contact rings disposed in each of the recesses, such as electrically conductive contact rings 120 and 122, and combined contact ring 124, disposed in recesses 112, 118 and coincident recess 130, respectively. Combined contact ring 124 has a thrust contact surface 126 and a sleeve contact surface 128, and is disposed in the coincident recess 130 located at the adjacent ends of sleeve surface 98 and thrust surface 102, respectively. Thrust contact surface 126 serves as a contact ring in the thrust portion (corresponding to thrust recess 116) of coincident recess 130, and sleeve contact surface 128 serves as a contact ring in the sleeve portion (corresponding to sleeve recess 114) of coincident recess 130. Detecting means 110 also includes similar recesses and contact rings disposed in each of the sleeve and thrust surfaces of non-electrically conductive bearing 92, which have been shown in FIG. 3 with like features referred to with the same reference numerals as used for non-electrically conductive bearing 94, with the addition of a prime mark. It is to be understood that separate contact rings (not shown) could be disposed in each of the first and second non-electrically conductive bearings 92 and 94 in non-coincident recesses,—in place of the combined contact rings, without departing from the teachings of the invention. In addition, contact rings 120 and 122 could be combined into a single unitary member, as long as it is electrically insulated from contact ring 124.

The beginning of failure of a bearing, such as first and second non-electrically conductive bearings 92 and 94, respectively, is considered to be some finite enlargement of the radial bearing I.D., for example approximately 0.006 to 0.010 inch (0.15 to 0.25 mm), and some finite change in the thickness of the thrust bearing, for example 0.010 to 0.020 inch (0.25 to 0.50 mm). These dimensions should be selected such that no electrically conductive materials will come into contact with a harder wearing surface, should the bearing wear excessively. Accordingly, the electrically conductive contact rings such as metallic contact rings 120 and 122, respectively, should be disposed to depths within the recesses, such as recesses 112 and 118, within these tolerances from the sleeve and thrust surfaces, repectively. The combined contact rings, such as combined contact ring 124, should be disposed within the coincident recesses, such as coincident recess 130, such that the depth of each of the sleeve contact surfaces, such as sleeve contact surface 128, and the thrust contact surfaces, such as thrust contact surface 126, from each of the sleeve and thrust surfaces, is within these tolerances. A uniform depth of 0.010 inch (0.25 mm) for all the contact rings and contact surfaces of the combined contact rings from their respective bearing surfaces has proven successful in operation of the preferred embodiment.

In operation, should bearing failure of a predetermined amount (the amount determined by the depth the contact rings are disposed in their respective recesses) occur, the shaft 90 would have a corresponding displacement in some radial or thrust direction and would effect an electrical connection between the metallic shaft 90 and two of the electrically conductive contact rings such as contact rings 120, 122 and combined contact ring 124. If the contact rings are connected electrically to a relay, flip-flop circuit, or any other detecting circuit known in the art, it can be appreciated that the above-described shaft and contact ring arrangement would constitute an effective detecting means for detecting shaft displacement in any direction due to bearing wear. The detecting means can then be interconnected with means responsive to the detecting means such as an alarm circuit, pump de-energization circuit, or any other protective circuit known in the art, to perform desired functions. This will limit to a minimal amount the non-electrically conductive materials worn away and entering the oil, and prevent electrically conductive material from being generated.

A typical protective circuit and its interconnection with a typical detecting circuit, as well as a cross section of the first and second non-metallic bearings showing the electrical interconnection of the electrically conductive contact rings, is shown in FIG. 4. A de-energizing circuit 130 includes conductors 132 having terminals 134 which are adapted for connection to stator terminals 76. Conductors 132 are energized by a powder source shown generally at 136. Conductors 132 have two normally closed contacts 138 disposed therein for interrupting power to the pump stator. Three conductors and two normally closed contacts are shown for the three-phase pump motor, 62 only two conductors and one normally closed contact would be necessary for a single-phase pump motor. De-energizing circuit 130 is interconnected with and responsive to a detecting circuit 140 by means of conductors 142 and 144. Detecting circuit 140 further includes a normally open contact 146 connected to solenoid 148. Normally open contact 146 and normally closed contacts 138 are mechanically linked with and responsive to relay 150 of which solenoid 148 is the electromechanical operator. Conductors 152 and 154 connect electrically conductive contact ring circuit 156 in parallel with normally open contact 146. Electrically conductive contact ring circuit 156 includes the parallel connection of the first and second non-electrically conductive bearing's combined contact rings 124 and 124' connected to conductor 154, and the parallel connection of the first and second non-electrically conductive bearing's contact rings 120, 120', 122, and 122' connected to conductor 152.

During operation of pump 50, should any of the first or second bearing's sleeve or thrust surfaces wear, shaft 90 or thrust collars 104 or 106 would complete one of the physical contact ring circuits 160 shown by dotted lines in FIG. 4 through the physical contact of the electrically conductive contact rings with the metallic shaft and thrust collars. It is apparent that the four dotted line circuits 160 shown in FIG. 4 do not exhaust the possible physical contact ring circuits. Either of the combined contact rings may be electrically connected to any one of the non-combined contact rings through the metallic shaft and thrust collars to complete a physical contact ring circuit. When the circuit between two such metallic contact rings is completed, conductors 152 and 154 shunt normally open contact 146 to energize solenoid 148 and operate relay 150. When relay 150 operates, normally closed contacts 138 open, de-energizing stator 68 and shutting down pump 50. Simultaneously, normally open contact 146 closes to "seal in" relay 150 and prevent operation of the pump 50. The detecting circuit 140 can be reset by disconnecting the power source 136 from the conductors 132. Attempts to restart the pump would result in reactivating the detection circuit 140 in the same manner as before, unless the bearings have been repaired. In the transformer apparatus of the preferred embodiment a flow gauge alarm (not shown) will sound when the transformer is energized and the dielectric fluid has stopped circulating due to pump shutdown. For other applications of the invention, additional contacts may be operated by relay 150, or additional relays may be placed in parallel with relay 148, to energize alarms or other protective apparatus.

In conclusion, an improved fluid circulating pump has been disclosed which is suitable for use in electrical apparatus where contamination of an associated cooling/dielectric fluid may reduce the dielectric strength of the fluid, or any other application where conducting contamination, or excessive non-electrically conductive contamination, may be undesirable. The new and improved fluid circulating pump of the invention eliminates the possibility of such contamination by replacing certain electrically conductive elements of the pump with non-conductive elements, and by providing means for detecting wear of the shaft bearings. A predetermined displacement of the pump shaft is detected and the pump shut down before significant wear occurs. Although the preferred embodiments of the invention described herein were developed in order to solve certain problems within the transformer industry, this invention is not limited to such transformer applications or specific type of pump designs. Rather, this invention is broadly applicable to any electrical apparatus wherein it is desirable to circulate a non-contaminated cooling/insulating dielectric fluid. Although the pump of the preferred embodiment is a centrifugal or mixed flow pump, it should be understood the same principals would apply to axial flow type pumps or other designs. Moreover, this invention is not limited to fluid circulating pumps having only non-electrically conductive bearings. It can be readily seen that the means for detecting bearing wear would function in fluid circulating pumps having electrically conductive bearings, if steps were taken to insulate the electrically conductive contact rings from the recesses in which the electrically conductive bearings are housed.

I claim:

1. A motor-pump unit for circulating a fluid within electrical apparatus comprising:

a housing having a motor portion and a pump portion;

said motor portion of the housing being in fluid communication with the fluid circulated by said pump portion, to thereby lubricate and cool said motor portion;

a rotatable, electrically conductive shaft extending between said motor portion and said pump portion;

first and second sleeve bearings mounting said shaft for rotation in said housing;

said first and second bearings being constructed of non-electrically conductive material;

said first and second bearings each having a sleeve surface disposed radially adjacent to and in contact with the periphery of said shaft, and a thrust surface disposed at a predetermined angle relative to said sleeve surface which will accept thrust loads;

first and second electrically conductive thrust collars disposed on said shaft axially adjacent to said thrust surfaces of the first and second bearings, respectively;

said first and second bearings each including at least two recesses disposed in each of their sleeve and thrust surfaces;

and detecting means for detecting bearing wear in both the radial and axial directions, including electrically conductive contact rings disposed in said recesses to effect an electrical connection between said contact rings through said shaft and said thrust collars upon a predetermined radial or axial displacement of the shaft in any direction due to wear of the first and second bearing's sleeve and thrust surfaces;

said detecting means additionally including means electrically connecting said contact rings which is adapted for connection to protective apparatus.

2. The motor-pump unit of claim 1 wherein the sleeve surface and the thrust surface of each of the first and second bearings meet at the periphery of the shaft, with one of the recesses in each of the sleeve and thrust surfaces being located to coincide at the adjacent ends of their respective surfaces to form first and second coincident recesses, respectively, each having a thrust portion and a sleeve portion, and wherein a single contact ring is disposed in each of said first and second coincident recesses with each of said single contact rings including a thrust contact surface and a sleeve contact surface, with the thrust contact surface functioning as a contact ring in the thrust portion of its associated coincident recess, and with the sleeve contact surface functioning as a contact ring in the sleeve portion of its associated coincident recess.

3. Electrical apparatus comprising:

a tank;

a liquid dielectric disposed in said tank;

a motor-pump unit for circulating said liquid dielectric within said tank, said motor-pump unit including a housing having a motor portion and a pump portion, said motor portion of the housing being in fluid communication with the liquid dielectric being circulated by the pump portion, to thereby cool and lubricate said motor portion;

a rotatable metallic shaft extending between said motor portion and said pump portion;

first and second sleeve bearings mounting said shaft for rotation in said housing;

said first and second bearings being constructed of non-electrically conductive material;

said first and second bearings each having a sleeve surface disposed radially adjacent to and in contact with the periphery of said shaft, and a thrust surface disposed at an angle relative to said sleeve surface which will accept thrust loads, first and second metallic thrust collars disposed on said shaft axially adjacent to said thrust surfaces of the first and second bearings, respectively;

said first and second bearings including at least two recesses disposed in each of their sleeve and thrust surfaces;

and detecting means for detecting bearing wear in both the radial and axial direction, including electrically conductive contact rings disposed in said recesses to effect an electrical connection between said contact rings through said shaft and said thrust collars upon a predetermined radial or axial displacement of the shaft in any direction due to wear of the first and second bearing's sleeve and thrust surfaces;

said detecting means additionally including means electrically connecting said contact rings which is adapted for connection to protective apparatus.

4. The electrical apparatus of claim 3 wherein the sleeve surface and the thrust surface of each of the first and second bearings meet at the periphery of the shaft, with one of the recesses in each of the sleeve and thrust surfaces of the first and second bearings being located to coincide at the adjacent ends of their respective surfaces to form first and second coincident recesses, respectively, each of said first and second coincident recesses having a thrust portion and a sleeve portion, and wherein a single contact ring is disposed within each of said first and second coincident recesses, with each of said single contact rings having a thrust contact surface and a sleeve contact surface, with the thrust contact surface functioning as a contact ring in the thrust portion of its associated coincident recess, and said sleeve contact surface functioning as a contact ring in the sleeve portion of its associated coincident recess.

5. A protected motor-pump unit for circulating liquid in a liquid-cooled electrical apparatus, including means for minimizing undesirable dislodging of contaminant particles into the circulating liquid by the motor-pump unit, comprising:

a pump and an electrical motor having a common shaft and disposed in a common housing, the housing including liquid passages for allowing a portion of the liquid passing through the pump to cool the electrical motor, said shaft comprising electrically conductive material;

bearing means comprising electrically non-conductive material and having at least first and second journal bearing surfaces providing support for the shaft in radial and axial directions, respectively;

at least first, second, and third conductive annular members stationarily disposed respectively in said bearing surfaces, said annular members being recessed below the bearing surfaces by a predetermined wear-dimension; and electrical circuit means for detecting when the wear of the bearing means in either of the first and second journal bearing surfaces just exceeds said predetermined wear dimension, enabling the conductive shaft to selectively contact the first and second conductive annular members, said electrical circuit means comprising connections to said first and second annular members, said electrical circuit means being adapted for warning or tripping purposes.

6. The protected motor-pump unit of claim 5 wherein the bearing means includes first and second sleeve bearings having thrust collars which provide axial support to the shaft in opposite directions.

7. The protected motor-pump unit of claim 5 wherein the bearing means included at least one sleeve bearing having first and second journal bearing surfaces providing support for the shaft in radial and axial directions, respectively, with said first and second journal bearing surfaces intersecting at a common recess, and wherein each of the first and second journal bearing surfaces include an additional recess spaced from said common recess, and wherein one each of the first, second and third conductive annular members are disposed in said common and additional recesses, with the conductive annular member disposed in each common recess having first and second surfaces which cooperate with the additional conductive annular members disposed in the first and second journal bearing surfaces, respectively, to detect wear of said first and second journal bearing surfaces.

* * * * *